United States Patent
Liu et al.

(10) Patent No.: US 11,238,262 B2
(45) Date of Patent: Feb. 1, 2022

(54) FINGERPRINT IDENTIFICATION MODULE AND DISPLAY DEVICE

(71) Applicants: Chengdu BOE Optoelectronics Technology Co., Ltd., Chengdu (CN); BOE TECHNOLOGY GROUP CO., LTD., Beijing (CN)

(72) Inventors: Qianqian Liu, Beijing (CN); Bin Zhang, Beijing (CN); Chang Wang, Beijing (CN); Tiegang Wang, Beijing (CN); Xiao Ma, Beijing (CN); Fuzheng Xie, Beijing (CN)

(73) Assignees: Chengdu BOE Optoelectronics Technology Co., Ltd., Chengdu (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/767,700

(22) PCT Filed: Dec. 16, 2019

(86) PCT No.: PCT/CN2019/125652
§ 371 (c)(1),
(2) Date: May 28, 2020

(87) PCT Pub. No.: WO2020/140741
PCT Pub. Date: Jul. 9, 2020

(65) Prior Publication Data
US 2021/0224502 A1    Jul. 22, 2021

(30) Foreign Application Priority Data
Jan. 2, 2019 (CN) .......................... 201910002206.0

(51) Int. Cl.
*G06K 9/00* (2006.01)

(52) U.S. Cl.
CPC ................... *G06K 9/0004* (2013.01)

(58) Field of Classification Search
CPC .............................. G06F 3/042; G06K 9/0004
See application file for complete search history.

(56) References Cited

U.S. PATENT DOCUMENTS

2005/0169506 A1*  8/2005  Fenrich .............. G06K 9/00046
                                                              382/127
2006/0203344 A1    9/2006  Miura et al.
(Continued)

FOREIGN PATENT DOCUMENTS

CN          1697037 A      11/2005
CN        101424768 A       5/2009
(Continued)

OTHER PUBLICATIONS

International Search Report and Written Opinion dated Mar. 18, 2020 PCT/CN2019/125652.
(Continued)

*Primary Examiner* — Joseph R Haley
(74) *Attorney, Agent, or Firm* — Thomas | Horstemeyer, LLP

(57) ABSTRACT

The present application relates to a fingerprint identification module and a display device. The fingerprint identification module includes: a first lens assembly; a second lens assembly with a primary optical axis not parallel to a primary optical axis of the first lens assembly; a reflecting mirror assembly, including a reflecting mirror and a rotating shaft coupled to the reflecting mirror, wherein the rotating shaft can drive the reflecting mirror to rotate, and the reflecting mirror includes a reflecting surface; and a light-sensitive element located at a light exiting side of the second lens assembly. The first lens assembly converges fingerprint-reflected light and projects the fingerprint-reflected light onto the reflecting surface, the reflecting surface reflects the (Continued)

fingerprint-reflected light to the second lens assembly, the second lens assembly converges the fingerprint-reflected light to the light-sensitive element, the light-sensitive element converts the fingerprint-reflected light into an electrical signal to identify fingerprint information.

20 Claims, 2 Drawing Sheets

(56) References Cited

U.S. PATENT DOCUMENTS

| | | | |
|---|---|---|---|
| 2020/0005567 A1* | 1/2020 | Chiu | G06K 9/2018 |
| 2020/0012834 A1* | 1/2020 | Fan | G06K 9/00046 |

FOREIGN PATENT DOCUMENTS

| | | | |
|---|---|---|---|
| CN | 101487983 | A | 7/2009 |
| CN | 201319176 | Y | 9/2009 |
| CN | 102651065 | A | 8/2012 |
| CN | 102830584 | A | 12/2012 |
| CN | 103092001 | A | 5/2013 |
| CN | 103593657 | A | 2/2014 |
| CN | 103676483 | A | 3/2014 |
| CN | 103822910 | A | 5/2014 |
| CN | 104766050 | A | 7/2015 |
| CN | 205015744 | U | 2/2016 |
| CN | 106292133 | A | 1/2017 |
| CN | 107682599 | A | 2/2018 |
| CN | 207586633 | U | 7/2018 |
| CN | 109074492 | A | 12/2018 |
| CN | 109685034 | A | 4/2019 |
| EP | 1703307 | A1 | 9/2006 |

OTHER PUBLICATIONS

1st Office Action dated Apr. 26, 2020 for Chinese Patent Application No. 201910002206.0.

Notice of Allowance dated Nov. 6, 2020 for Chinese Patent Application No. 201910002206.0.

* cited by examiner

FINGERPRINT IDENTIFICATION MODULE AND DISPLAY DEVICE

CROSS-REFERENCE TO RELATED APPLICATIONS

The present application is a national phase application under 35 U.S.C. § 371 of International Patent Application No. PCT/CN2019/125652, filed on Dec. 16, 2019, which claims the benefit of and priority to Chinese Patent Application No. 201910002206.0, entitled "FINGERPRINT IDENTIFICATION MODULE AND DISPLAY DEVICE," filed on Jan. 2, 2019, the entire contents of which are incorporated herein by reference.

TECHNICAL FIELD

The present application relates to the field of display technology and, in particular, to a fingerprint identification module and a display device.

BACKGROUND

With the development of OLED (Organic Light Emitting Diode) display technology, a mobile terminal such as a mobile phone with a full screen has become popular and thus, under-screen fingerprint identification will become a trend.

At present, under-screen fingerprint identification technology mainly includes two types, i.e., an ultrasonic fingerprint identification technology and an optical fingerprint identification technology. Among them, the optical fingerprint identification technology has a relatively large identification range and relatively low cost, and thus is widely used in OLED display devices.

Generally speaking, a light path in an optical fingerprint identification module is in a straight line. However, according to the imaging principle and the requirement for depth of field, the fingerprint identification module should have enough thickness in a direction of the light path to ensure an imaging effect, which is bad for lightening and thinning of the display devices. In addition, since different users or the same user may press a fingerprint area at different angles at different times, the optical fingerprint identification module further has a problem of low identification accuracy.

It should be noted that the information disclosed in the above background section is only for enhancing the understanding of the background of the present application and therefore, may include information that does not constitute the prior art known to those skilled in the art.

SUMMARY

A first aspect of the present disclosure provides a fingerprint identification module, including: a first lens assembly; a second lens assembly with a primary optical axis not parallel to a primary optical axis of the first lens assembly; a reflecting mirror assembly, including a reflecting mirror and a rotating shaft coupled to the reflecting mirror, wherein the rotating shaft can drive the reflecting mirror to rotate, the reflecting mirror includes a reflecting surface, and the reflecting surface is located at a light exiting side of the first lens assembly and a light incident side of the second lens assembly; and a light-sensitive element located at a light exiting side of the second lens assembly. The first lens assembly is configured to converge fingerprint-reflected light and project the fingerprint-reflected light onto the reflecting surface, the reflecting surface is configured to reflect the fingerprint-reflected light to the second lens assembly, the fingerprint-reflected light transmits through the second lens assembly to be converged to the light-sensitive element, the light-sensitive element is configured to convert the fingerprint-reflected light into an electrical signal to identify fingerprint information.

In an exemplary embodiment of the present application, the reflecting mirror assembly further includes: a driving element, coupled to the rotating shaft; a detecting element, configured to detect an incident angle of the fingerprint-reflected light projected on the reflecting surface; and a control element, coupled to the detecting element and the driving element, and configured to control the driving element to drive the rotating shaft to rotate according to the incident angle detected by the detecting element.

In an exemplary embodiment of the present application, a plurality of the detecting elements are provided, and in a projection obtained in a direction perpendicular to the reflecting surface, projective planes of the respective detecting elements are evenly distributed in a projective plane of the reflecting surface.

In an exemplary embodiment of the present application, the detecting element includes a photosensitive element.

In an exemplary embodiment of the present application, the fingerprint identification module further includes a filter part, provided on a light incident side of the first lens assembly and configured to filter out stray light in the fingerprint-reflected light.

In an exemplary embodiment of the present application, the filter part includes a filter film attached to the light incident surface of the first lens assembly.

In an exemplary embodiment of the present application, in a projection obtained in a direction perpendicular to the reflecting surface, a center point of the reflecting surface is projected onto an axis of the rotating shaft.

In an exemplary embodiment of the present application, the axis of the rotating shaft is perpendicular to both the primary optical axis of the first lens assembly and the primary optical shaft of the second lens assembly.

In an exemplary embodiment of the present application, the primary optical axis of the second lens assembly passes through a center of the reflecting surface, and the primary optical axis of the first lens assembly passes through the center of the reflecting surface.

In an exemplary embodiment of the present application, the primary optical axis of the first lens assembly is perpendicular to the primary optical axis of the second lens assembly.

In an exemplary embodiment of the present application, the primary optical axis of the second lens assembly passes through a center of a light-sensitive surface of the light-sensitive element.

A second aspect of the present application provides a display device, including a display panel and the fingerprint identification module according to any one of the above. In a projection obtained in a thickness direction of the display panel, a projective plane of the fingerprint identification module is located in a projective plane of the display panel.

BRIEF DESCRIPTION OF THE DRAWINGS

The drawings herein are incorporated into the specification, constitute a part of the specification, illustrate embodiments consistent with the present application, and together with the specification, server to explain the principle of the present application. Understandably, the drawings in the following description are only some embodiments of the present application. Those skilled in the art may obtain other drawings based on these drawings without paying any creative labor.

DETAILED DESCRIPTION

Figure 1:
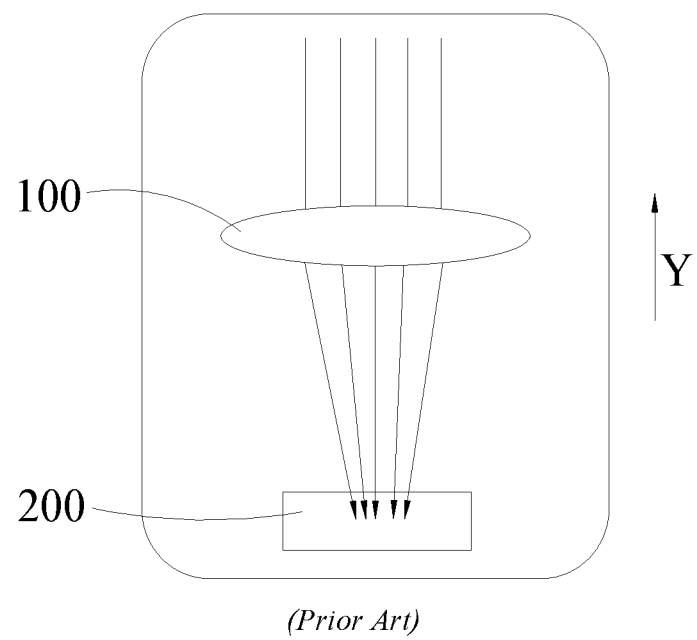
FIG. 1 is a schematic structural diagram of a fingerprint identification module according to an embodiment of the related art.

Example embodiments will now be described more fully with reference to the drawings. However, the example embodiments may be implemented in various forms, and should not be construed as being limited to the embodiments set forth herein; on the contrary, these embodiments are provided so that the present application is comprehensive and complete and the concept of the example embodiments is fully conveyed to those skilled in the art. Same reference numerals in the drawings denote same or similar structures, and thus detailed descriptions thereof will be omitted.

Although relative terms such as "upper" and "lower" are used in the specification to describe a relative relationship between one component and another component shown, these terms are only for convenience of the description in the specification. It can be understood that if a shown device is turned upside down, a component described as "upper" will become a component described as "lower". When a structure is "on" another structure, it may mean that the structure is integrally formed on the other structure, or that the structure is "directly" disposed on the other structure, or that the structure is "indirectly" disposed on the other structure through an additional structure.

The terms "an", "a", "said", and "the" are used to indicate presence of one or more elements/components/etc. The terms "include" and "have" are used to mean an open-ended inclusion and refer to that in addition to listed elements/components/etc., there may be additional elements/components/etc. The terms "first" and "second" are only used as markers, and are not intended to limit the number of objects.

Generally, an optical fingerprint identification module mainly includes two parts, that is, a fingerprint collecting module 100 and a fingerprint imaging module 200. The fingerprint collecting module 100 is usually composed of various lenses, and the fingerprint imaging module 200 is usually a light-sensitive element 4 such as a charge coupled device (CCD) or a complementary metal oxide semiconductor (CMOS). As shown in FIG. 1, central axes of the fingerprint collecting module 100 and the fingerprint imaging module 200 are usually arranged in a straight line in a vertical direction (a Y direction shown in FIG. 1), that is, generally, a light path in the optical fingerprint identification module is in a straight line. Such optical path design has a simple structure. However, according to the imaging principle and the requirement for depth of field, it should ensure a certain distance between the fingerprint imaging module 200 and the fingerprint collecting module 100 for clear imaging, so the fingerprint identification module must have an enough thickness in a direction of the light path to ensure an imaging effect. That is, it limits the possibility that the fingerprint identification module become thinner. Since the fingerprint identification module needs to be installed under the screen of the display device, a larger thickness thereof would directly affect a thickness of the display device, which is in contradiction with a current trend that a display product is developed to be thinner.

Figure 2:
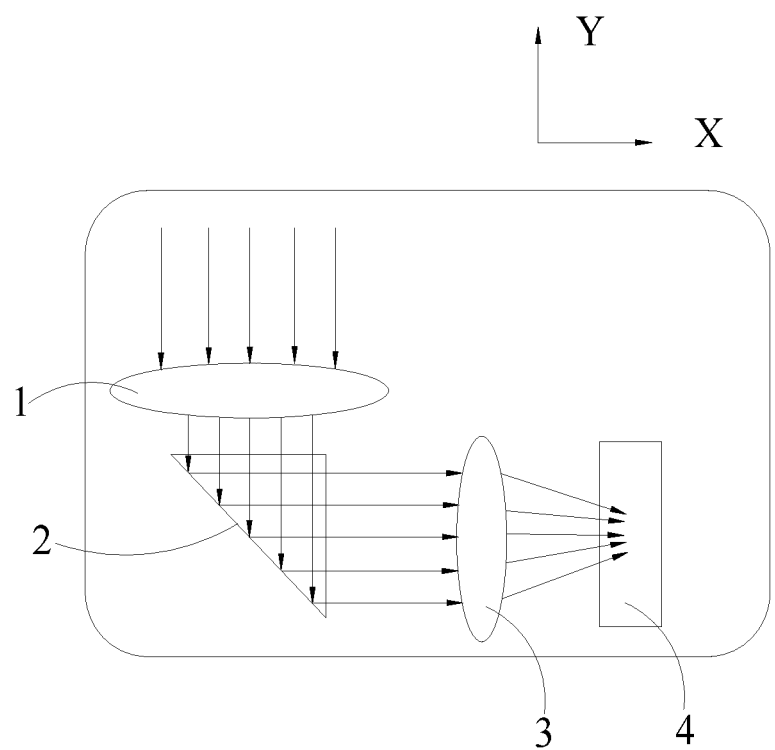
FIG. 2 is a schematic structural diagram of a fingerprint identification module according to another embodiment of the related art.

In the related art, there is provided a fingerprint identification module in order to reduce the thickness of the fingerprint identification module. As shown in FIG. 2, the fingerprint identification module includes a first lens assembly 1, a reflecting mirror 2, a second lens assembly 3, and a light-sensitive element 4. A light beam, which is converged by the first lens assembly 1 to transmit in a vertical direction (a Y direction shown in FIG. 2), is changed by the reflecting mirror 2 to transmit in a horizontal direction (an X direction shown in FIG. 2), and then is converged by the second lens assembly 3 onto the light-sensitive element 4. Although such arrangement may reduce the thickness of the fingerprint identification module in the vertical direction, the reflecting mirror 2 only has a good reflecting capability for the light beam incident at a specific angle. Since different users or the same user may press a fingerprint area at different angles at different times, the optical fingerprint identification module has a problem of low identification accuracy.

In order to solve the technical problem mentioned above, an embodiment of the present application provides a fingerprint identification module, which may be an optical fingerprint identification module and can be applied to a display device, such as an OLED display device, but is not limited thereto.

Figure 3:
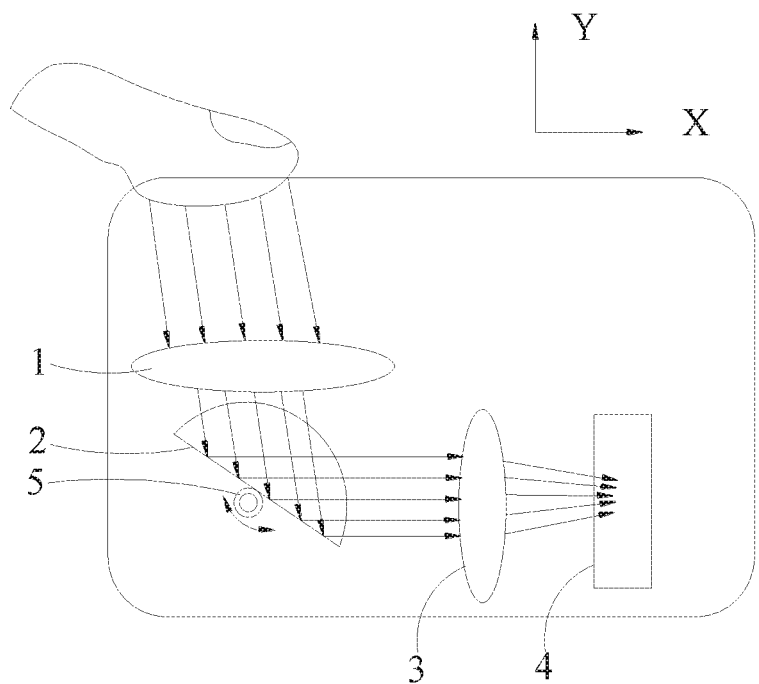
FIG. 3 is a schematic structural diagram of a fingerprint identification module according to an embodiment of the present application.
Figure 4:
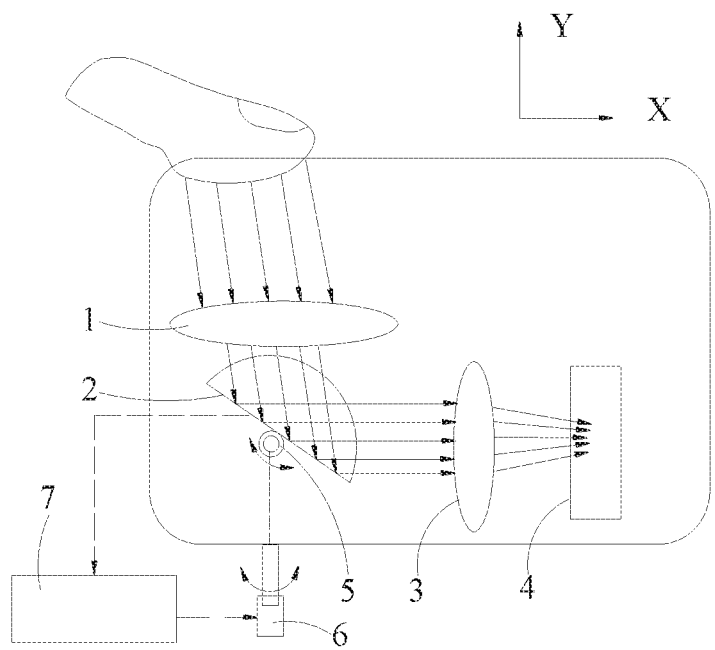
FIG. 4 is a schematic structural diagram of another fingerprint identification module according to another embodiment of the present disclosure application.

In an embodiment, as shown in FIGS. 3 and 4, the fingerprint identification module includes a first lens assembly 1, a second lens assembly 3, a reflecting mirror assembly and a light-sensitive element 4. The first lens assembly 1, the second lens assembly 3, and the reflecting mirror assembly may be collectively referred to as a fingerprint collecting module of the fingerprint identification module. The light-sensitive element 4 may be referred to as a fingerprint imaging module of the fingerprint identification module. Specifically, a primary optical axis of the second lens assembly 3 is not parallel to a primary optical axis of the first lens assembly 1. The reflecting mirror assembly may include a reflecting mirror 2 and a rotating shaft 5 coupled to the reflecting mirror 2. The rotating shaft 5 can drive the reflecting mirror 2 to rotate. The reflecting mirror 2 includes a reflecting surface, and the reflecting surface is located at a light exiting side of the first lens assembly 1 and a light incident side of the second lens assembly 3. The light-sensitive element 4 is located at a light exiting side of the second lens assembly 3.

The first lens assembly 1 is configured to converge fingerprint-reflected light and project the fingerprint-reflected light converged onto the reflecting surface of the reflecting mirror 2. The first lens assembly 1 may be composed of various lenses, and the lens may be a convex lens, a concave lens, a prism, etc., but is not limited thereto. The aforementioned fingerprint-reflected light may refer to a light beam that is reflected by a finger of a user when the finger touches the fingerprint identification module and the light beam emitted by a display panel of the display device arrives at the finger.

The reflecting surface of the reflecting mirror 2 is configured to reflect the fingerprint-reflected light converged by the first lens assembly 1 to the second lens assembly 3. The reflecting surface generally is a flat surface. When the reflecting mirror 2 is mounted initially, an angle between the reflecting surface of the reflecting mirror 2 and the vertical direction (Y directions shown in FIGS. 3 and 4) and that between the reflecting surface of the reflecting mirror 2 and the horizontal direction (X directions as shown in FIGS. 3 and 4) may be 45°, but is not limited thereto.

The second lens assembly 3 is configured to converge the fingerprint-reflected light reflected by the reflecting surface of the reflecting mirror 2 to the light-sensitive element 4. The second lens assembly 3 may be composed of various lenses, and the lens may be a convex lens, a concave lens, a prism, etc., but is not limited thereto.

The light-sensitive element 4 is configured to convert the fingerprint-reflected light converged by the second lens assembly 3 into an electrical signal to identify fingerprint information. The light-sensitive element 4 may be a CCD imaging element or a COMS imaging element.

It can be seen from the above description, in the fingerprint identification module of the embodiment, the primary optical axis of the second lens assembly 3 is not parallel to the primary optical axis of the first lens assembly 1, the reflecting surface of the reflecting mirror 2 in the reflecting mirror assembly is located at the light exiting side of the first lens assembly 1 and the light incident side of the second lens assembly 3, and thus the fingerprint-reflected light which is converged by the first lens assembly 1 may be reflected by the reflecting mirror 2 to the second lens assembly 3, and then is converged by the second lens assembly 3 to the light-sensitive element 4. In other words, the reflecting mirror 2 can effectively change a transmitting direction of the fingerprint-reflected light in the fingerprint identification module, so that the transmitting direction of the fingerprint-reflected light in the fingerprint module is not in a straight line, which may reduce the thickness of the fingerprint identification module and at the same time ensures the imaging effect of the fingerprint identification module, thereby facilitating the lightening and thinning of the display device.

In addition, the reflecting mirror 2 in the reflecting mirror assembly is coupled to a rotating shaft 5, which can drive the reflecting mirror 2 to rotate, so that an angle of the reflecting mirror 2 may be adjusted according to angles at the which the fingers of different users press a finger identification area (i.e., according to different incident directions of different incident light). Therefore, more fingerprint-reflected light may be converged to the light-sensitive surface of the light-sensitive element 4 through the second lens assembly 3, thereby improving an imaging accuracy of the fingerprint identification module, and in turn improving a fingerprint identification accuracy and sensitivity of the fingerprint recognition module.

It should be noted that the fingerprint-reflected light entering into the first lens assembly 1 shown in FIGS. 3 and 4 is parallel light, but is not limited thereto. In addition, as mentioned above, the first lens assembly 1 and the second lens assembly 3 are used to converge the fingerprint-reflected light, and the "converge" in the embodiment refers to that a minimum distance between adjacent incident light rays becomes smaller after they transmit through the first lens assembly 1 or the second lens assembly 3. As shown in FIGS. 3 and 4. parallel fingerprint-reflected light may still be the parallel light after being converged by the first lens assembly 1, but the distance between the light rays becomes smaller to indicate the converging effect of the first lens assembly 1. The parallel fingerprint-reflected light reflected by the reflecting mirror 2 can be tapered after being converged by the second lens assembly 3, to indicate the converging effect of the second lens assembly 3.

The fingerprint identification module mentioned in the present application will be described in detail below with reference to the drawings.

In an embodiment, in a projection obtained in a direction perpendicular to the reflecting surface, a center point of the reflecting surface is projected on an axis of the rotating shaft 5, which can shorten a path of the reflecting surface when rotating so as to reduce an occupying space of the reflecting mirror 2, thereby reducing the thickness of the fingerprint recognition module, which facilitates the lightening and thinning of the display device.

Optionally, the axis of the rotating shaft 5 is perpendicular to both the primary optical axis of the first lens assembly 1 and the primary optical axis of the second lens assembly 3, which design can reduce the difficulty in arranging the reflecting mirror 2 so as to reduce the difficulty in adjusting the reflecting mirror 2 according to different incident directions of the fingerprint-reflected light, so that the reflecting mirror 2 can reflect more fingerprint-reflected light. Therefore, more fingerprint-reflected light can be converged to the light-sensitive surface of the light-sensitive element 4 through the second lens assembly 3, thereby improving the imaging accuracy of the fingerprint identification module, and in turn improving the fingerprint identification accuracy and sensitivity of the fingerprint identification module.

The primary optical axis of the second lens assembly 3 may pass through a center of the reflecting surface, and the primary optical axis of the first lens assembly 1 may pass through the center of the reflecting surface. Such design allows that more fingerprint-reflected light transmits through the first lens assembly 1 to project onto the reflecting surface, and more fingerprint-reflected light can be reflected by the reflecting surface to the second lens assembly 3 and is converged by the second lens assembly 3 to the light-sensitive surface of the light-sensitive element 4, thereby improving the imaging accuracy of the fingerprint identification module, and in turn improving the fingerprint identification accuracy and sensitivity of the fingerprint identification module. In addition, such design can also appropriately reduce the thickness of the fingerprint identification module, which facilitates the lightening and thinning of the display device.

Further, the primary optical axis of the first lens assembly 1 is perpendicular to the primary optical axis of the second lens assembly 3, so as to achieve a reasonable arrangement of the first lens assembly 1, the reflecting mirror assembly, and the second lens assembly 3 to reduce the thickness of the fingerprint identification module, which facilitates the lightening and thinning of the display device.

In an embodiment, the primary optical axis of the second lens assembly 3 passes through the center of the light-sensitive surface of the light-sensitive element 4, which can increase the amount of the fingerprint-reflected light received by the light-sensitive element 4, thereby improving the imaging accuracy of the fingerprint identification module, and in turn improving the fingerprint identification accuracy and sensitivity of the fingerprint identification module.

As mentioned above, the rotating shaft 5 in the reflecting mirror assembly can drive the reflecting mirror 2 to rotate, specifically, which can be implemented in the following two ways.

In a first implementation, as shown in FIG. 3, the rotating shaft 5 coupled to the reflecting mirror 2 may be manually rotated according to a finger pressing habit of the user, so that the rotating shaft 5 drives the reflecting mirror 2 to rotate, so as to adjust the reflecting mirror 2 to an optimal position, thereby improving the fingerprint identification accuracy and sensitivity of the fingerprint identification module.

In a second implementation, as shown in FIG. 4, the rotating shaft 5 may be controlled to automatically rotate by detecting the incident direction of the fingerprint-reflected light to drive the reflecting mirror 2 to rotate, so as to adjust the reflecting mirror 2 to an optimal position, thereby improving the fingerprint identification accuracy and sensitivity of the fingerprint identification module.

Specifically, as for the second implementation, in an embodiment, the reflecting mirror assembly may further include a driving element 6, a detecting element (not shown in the figure), and a control element 7.

The driving element 6 may be coupled to the rotating shaft 5. For example, the driving element 6 may be a micro motor, but it is not limited thereto.

The detecting element is configured to detect an incident angle of the fingerprint-reflected light projected on the reflecting surface. For example, the detecting element may include a photosensitive element, but is not limited thereto. The photosensitive element may not only detect the incident angle of the fingerprint-reflected light projected on the reflecting surface, but also detect an intensity of the fingerprint-reflected light projected on the reflecting surface. By detecting the intensity of the fingerprint-reflected light, the detecting accuracy may be further improved.

A plurality of the detecting elements may provided, and in a projection obtained in a direction perpendicular to the reflecting surface, projective planes of the plurality of detecting elements are evenly distributed in a projective plane of the reflecting surface, which can improve the detecting accuracy, thereby improving the precision at which the reflecting mirror is rotated.

The control element 7 is coupled to the detecting element and the driving element 6. The control element 7 is configured to control the driving element 6 to drive the rotating shaft 5 to rotate according to the incident angle detected by the detecting element. For example, the control element 7 may be wired or wirelessly coupled to the detecting element and the driving element 6. It should be noted that the control element 7 may be a master control chip of the display device or an element independent of the master control chip in the display device. In addition, the control element 7 may be directly coupled to the rotating shaft 5 to control the rotating shaft 5 to rotate.

In an embodiment of the present application, the fingerprint identification module may further include a filter part, provided on a light incident side of the first lens assembly 1 and configured to filter out stray light in the fingerprint-reflected light, so as to improve the fingerprint identification accuracy and sensitivity of the fingerprint identification module.

The filter part may include a filter film attached to the light incident surface of the first lens assembly 1, which can shorten the time for positioning the filter part and the first lens assembly 1, and facilitate assembling of the fingerprint identification module. In addition, the filter film is attached to the light incident surface of the first lens assembly 1, therefore the filter film does not occupy too much space, to avoid the fingerprint identification module from being thickened due to the addition of the filter part and facilitate the thinning and lightening of the fingerprint identification module.

It should be noted that, in FIGS. 1 to 4, the solid arrows other than the solid arrows indicating the X direction and the Y direction refer to the propagating direction of the fingerprint-reflected light. The solid double arrows in FIGS. 3 and 4 refer to the direction of rotation. The dotted arrow in FIG. 4 refers to the direction of signal transmission corresponding to the incidence angle of the fingerprint-reflected light. The broken line in FIG. 4 is used to indicate that the driving element 6 is coupled to the rotating shaft 5.

An embodiment of the present application further provides a display device, which includes a display panel and the fingerprint identification module according to any one of the above embodiments. The display panel may be an OLED display panel, but it is not limited thereto. In a projection obtained in a thickness direction of the display panel, a projective plane of the fingerprint identification module is located in a projective plane of the display panel, but the present disclosure is not limited thereto.

After considering the description and practicing the invention disclosed herein, those skilled in the art will easily conceived of other embodiments of the present application. The present application is intended to cover any variations, uses, or adaptations of this application, which follow the general principles of this application and include the common general knowledge or customary technical means in the technical field not disclosed in this application. The description and examples are to be considered exemplary only, and the true scope and spirit of this application are pointed out by the appended claims.

What is claimed is:

1. A fingerprint identification module, comprising:
    a first lens assembly;
    a second lens assembly with a primary optical axis not parallel to a primary optical axis of the first lens assembly;
    a reflecting mirror assembly comprising a reflecting mirror and a rotating shaft coupled to the reflecting mirror, wherein the rotating shaft is configured to drive the reflecting mirror to rotate, the reflecting mirror comprises a reflecting surface, and the reflecting surface is located at a light exiting side of the first lens assembly and a light incident side of the second lens assembly; and
    a light-sensitive element located at a light exiting side of the second lens assembly, wherein:
    the first lens assembly is configured to converge fingerprint-reflected light and project the fingerprint-reflected light onto the reflecting surface, the reflecting surface is configured to reflect the fingerprint-reflected light to the second lens assembly, the second lens assembly is configured to converge the fingerprint-reflected light to the light-sensitive element, and the light-sensitive element is configured to convert the fingerprint-reflected light into an electrical signal to identify fingerprint information; and
    the reflecting mirror assembly further comprises:
        a driving element coupled to the rotating shaft;
        a detecting element configured to detect an incident angle of the fingerprint-reflected light projected on the reflecting surface; and
        a control element coupled to the detecting element and the driving element, and configured to control the driving element to drive the rotating shaft to rotate according to the incident angle detected by the detecting element.

2. The fingerprint identification module according to claim 1, wherein:
    the detecting element is one of a plurality of detecting elements; and in a projection obtained in a direction perpendicular to the reflecting surface, projective planes of the plurality of detecting elements are evenly distributed in a projective plane of the reflecting surface.

3. The fingerprint identification module according to claim 1, wherein the detecting element comprises a photosensitive element.

4. The fingerprint identification module according to claim 1, wherein the rotating shaft is configured to be adjusted manually.

5. The fingerprint identification module according to claim 1, further comprising a filter part provided on a light incident side of the first lens assembly and configured to filter out stray light in the fingerprint-reflected light.

6. The fingerprint identification module according to claim 5, wherein the filter part comprises a filter film attached to the light incident surface of the first lens assembly.

7. The fingerprint identification module according to claim 1, wherein, in a projection obtained in a direction perpendicular to the reflecting surface, a center point of the reflecting surface is projected onto an axis of the rotating shaft.

8. The fingerprint identification module according to claim 7, wherein the axis of the rotating shaft is perpendicular to both the primary optical axis of the first lens assembly and the primary optical axis of the second lens assembly.

9. The fingerprint identification module according to claim 8, wherein the primary optical axis of the second lens assembly passes through a center of the reflecting surface, and the primary optical axis of the first lens assembly passes through the center of the reflecting surface.

10. The fingerprint identification module according to claim 9, wherein the primary optical axis of the first lens assembly is perpendicular to the primary optical axis of the second lens assembly.

11. The fingerprint identification module according to claim 1, wherein the primary optical axis of the second lens assembly passes through a center of a light-sensitive surface of the light-sensitive element.

12. A display device, comprising:
a display panel; and
a fingerprint identification module, comprising:
a first lens assembly;
a second lens assembly with a primary optical axis not parallel to a primary optical axis of the first lens assembly;
a reflecting mirror assembly comprising a reflecting mirror and a rotating shaft coupled to the reflecting mirror, wherein the rotating shaft is configured to drive the reflecting mirror to rotate, the reflecting mirror comprises a reflecting surface, and the reflecting surface is located at a light exiting side of the first lens assembly and a light incident side of the second lens assembly; and
a light-sensitive element located at a light exiting side of the second lens assembly, wherein:
the first lens assembly is configured to converge fingerprint-reflected light and project the fingerprint-reflected light onto the reflecting surface, the reflecting surface is configured to reflect the fingerprint-reflected light to the second lens assembly, the second lens assembly is configured to converge the fingerprint-reflected light to the light-sensitive element, and the light-sensitive element is configured to convert the fingerprint-reflected light into an electrical signal to identify fingerprint information;
in a projection obtained in a thickness direction of the display panel, a projective plane of the fingerprint identification module is located in a projective plane of the display panel; and
the reflecting mirror assembly further comprises:
a driving element coupled to the rotating shaft;
a detecting element configured to detect an incident angle of the fingerprint-reflected light projected on the reflecting surface; and
a control element coupled to the detecting element and the driving element, and configured to control the driving element to drive the rotating shaft to rotate according to the incident angle detected by the detecting element.

13. The display device according to claim 12, wherein:
the detecting element is one of a plurality of detecting elements; and
in a projection obtained in a direction perpendicular to the reflecting surface, projective planes of the plurality of detecting elements are evenly distributed in a projective plane of the reflecting surface.

14. The display device according to claim 12, wherein the detecting element comprises a photosensitive element.

15. The display device according to claim 12, wherein the rotating shaft is configured to be adjusted manually.

16. The display device according to claim 12, wherein the fingerprint identification module further comprises a filter part provided on a light incident side of the first lens assembly and configured to filter out stray light in the fingerprint-reflected light.

17. The display device according to claim 16, wherein the filter part comprises a filter film attached to the light incident surface of the first lens assembly.

18. The display device according to claim 12, wherein, in a projection obtained in a direction perpendicular to the reflecting surface, a center point of the reflecting surface is projected onto an axis of the rotating shaft.

19. A fingerprint identification module, comprising:
a first lens assembly;
a second lens assembly with a primary optical axis not parallel to a primary optical axis of the first lens assembly;
a reflecting mirror assembly comprising a reflecting mirror and a rotating shaft coupled to the reflecting mirror, wherein the rotating shaft is configured to drive the reflecting mirror to rotate, the reflecting mirror comprises a reflecting surface, and the reflecting surface is located at a light exiting side of the first lens assembly and a light incident side of the second lens assembly; and
a light-sensitive element located at a light exiting side of the second lens assembly, wherein:
the first lens assembly is configured to converge fingerprint-reflected light and project the fingerprint-reflected light onto the reflecting surface, the reflecting surface is configured to reflect the fingerprint-reflected light to the second lens assembly, the second lens assembly is configured to converge the fingerprint-reflected light to the light-sensitive element, and the light-sensitive element is configured to convert the fingerprint-reflected light into an electrical signal to identify fingerprint information;
the reflecting mirror assembly further comprises:
a driving element coupled to the rotating shaft;

a detecting element configured to detect an incident angle of the fingerprint-reflected light projected on the reflecting surface; and a control element coupled to the detecting element and the driving element, and configured to control the driving element to drive the rotating shaft to rotate according to the incident angle detected by the detecting element;

the detecting element is one of a plurality of detecting elements; and in a projection obtained in a direction perpendicular to the reflecting surface, projective planes of the plurality of detecting elements are evenly distributed in a projective plane of the reflecting surface.

20. The fingerprint identification module according to claim 19, further comprising a filter part provided on a light incident side of the first lens assembly and configured to filter out stray light in the fingerprint-reflected light.

* * * * *